Patented June 8, 1943

2,321,306

UNITED STATES PATENT OFFICE 2,321,306

ACCELERATOR OF VULCANIZATION

William E. Messer, Cheshire, Conn., assignor to United States Rubber Company, New York, N. Y., a corporation of New Jersey No Drawing. Original application June 24, 1939, Serial No. 280,929. Divided and this application May 10, 1940, Serial No. 334,343

1 Claim. (Cl. 260—306.6)

This invention relates to a new class of compounds which have been found valuable as accelerators for the vulcanization of rubber.

This case is a division of my copending application Serial No. 280,929, filed June 24, 1939.

The new class of rubber vulcanization accelerators may be represented by the general formula

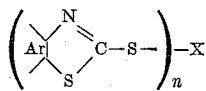

Ar is an arylene group; when $n$ is 2, X is NH; when $n$ is 3, X is N.

These materials are derivatives of arylene-thiazyl sulfur chloride, wherein the chlorine is replaced by the X radical above, when 2–3 moles of the arylene-thiazyl sulfur chloride is reacted with a mole of ammonia. During such reaction hydrogen chloride is split off.

In the following illustrative examples, benzothiazyl sulfur chloride is used for the reagent; it may be prepared in solution, for purposes of reaction by passing dry chlorine into a slurry of 1,1′ dithio bis benzothiazole in benzene, carbon tetrachloride, etc.

The accelerators are delayed-action accelerators similar in this respect to 1,1′ dithio bis benzothiazole itself. Hence they may be used alone or in conjunction with activating more basic nitrogen compounds such as ammonia, amines, guanidines such as diphenyl guanidine, thiuram sulphides such as tetramethyl thiuram monosulfide, etc. They may also, if desired, be used in admixture with other thiazole accelerators such as the mercapto-benzothiazyl sulfides.

The following examples are given to illustrate the invention in which comparison is made with a stock containing 1,1′ dithio bis benzothiazole (parts are by weight):

EXAMPLE I

Twenty ccs. liquid ammonia were dissolved in about 300 ccs. carbon tetrachloride and to this solution were added with stirring 150 ccs. carbon tetrachloride solution of 20 grams benzothiazyl sulfur chloride. Carbon tetrachloride solvent was recovered by evaporation and 22.5 grams residue was treated with water and precipitated, washed thoroughly, and dried giving 16.6 of a product having a melting range 140–155° C. with decomposition and 12.4% nitrogen (theory= 12.1% nitrogen).

Yield is 96% theory based on dibenzothiazyl disulfide used.

The product obtained from the above reaction consists essentially of:

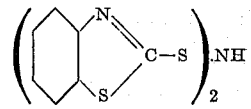

The following rubber mixes were made, vulcanized and tested.

| Stock | C | D |
|---|---|---|
| Pale crepe | 100 | 100 |
| Zinc oxide | 10 | 10 |
| Lithopone | 40 | 40 |
| Whiting | 50 | 50 |
| Suprex clay | 25 | 25 |
| Zinc soap of cocoanut oil acids | 1 | 1 |
| Sulfur | 3 | 3 |
| 1,1′-dithio bis benzothiazole | 0.65 | |
| Accelerator of Example 2 above | | 0.65 |

Tensiles—Unaged

| Minutes cure at 30 lbs./sq. in. steam pressure | C | | D | |
|---|---|---|---|---|
| | T | E | T | E |
| 10 | 80 | 773 | 200 | 773 |
| 20 | 1,270 | 550 | 1,200 | 506 |
| 30 | 2,000 | 570 | 2,400 | 576 |
| 40 | 2,350 | 583 | 2,600 | 556 |
| 50 | 2,260 | 573 | 2,530 | 563 |

Tensiles—Aged 6 days in oxygen

| Minutes cure at 30 lbs./sq. in. steam pressure | C | | D | |
|---|---|---|---|---|
| | T | E | T | E |
| 10 | 140 | 565 | 400 | 515 |
| 20 | 1,050 | 485 | 1,150 | 410 |
| 30 | 1,800 | 540 | 2,170 | 530 |
| 40 | 2,000 | 535 | 2,060 | 520 |
| 50 | 1,870 | 540 | 1,500 | 455 |

Scorch test

| Minutes cure at 5 lbs./sq. in. steam pressure | C | | D | |
|---|---|---|---|---|
| | T | E | T | E |
| 30 | | | | |
| 45 | | | | |
| 60 | | | | |
| 75 | | | | |
| 90 | 135 | 1,020 | 200 | 972 |
| 105 | 132 | 1,040 | 202 | 972 |
| 120 | 190 | 820 | 200 | 900 |

EXAMPLE II 8.6 grams 1,1'-dithio-bis-benzothiazole (crude) treated with theoretical amount of chlorine and 50 ccs. carbon tetrachloride and the product added gradually with good agitation to 20 ccs. concentrated ammonium hydroxide and 200 ccs. water. The resulting material was boiled to recover carbon tetrachloride used, cooled, precipitated, filtered off, washed and dried, obtaining 6.1 grams of a product having melting range 157–165° C. with decomposition (83% yield), and having 10.58% nitrogen. Theory for $(C_7H_4NS_2)_3N$ is 10.8% nitrogen.

The product consists essentially of:

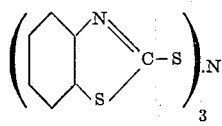

The following rubber mixes were made, vulcanized and tested.

| Stock | E | F |
|---|---|---|
| Pale crepe | 100 | 100 |
| Zinc oxide | 10 | 10 |
| Lithopone | 40 | 40 |
| Whiting | 50 | 50 |
| Suprex clay | 25 | 25 |
| Zinc soap of cocoanut oil acids | 1 | 1 |
| Sulfur | 3 | 3 |
| 1,1'-dithio bis benzothiazole | 0.65 | |
| Reaction product of Example 3 above | | 0.65 |

Tensiles—Unaged

| Minutes cure at 30 lbs./sq. in. steam pressure | E | | F | |
|---|---|---|---|---|
| | T | E | T | E |
| 20 | 640 | 560 | 450 | 513 |
| 30 | 1,600 | 603 | 1,600 | 590 |
| 45 | 2,240 | 603 | 2,360 | 610 |
| 60 | 2,260 | 600 | 2,370 | 603 |
| 75 | 2,260 | 603 | 2,350 | 700 |

Tensiles—Aged 168 hours in oxygen

| Minutes cure at 30 lbs./sq. in. steam pressure | E | | F | |
|---|---|---|---|---|
| | T | E | T | E |
| 20 | 700 | 476 | 700 | 466 |
| 30 | 1,200 | 506 | 1,350 | 516 |
| 45 | 1,600 | 566 | 1,570 | 533 |
| 60 | 1,450 | 533 | 1,200 | 505 |
| 75 | 1,200 | 523 | 630 | 353 |

Scorch test

| Minutes cure at 5 lbs./sq. in. steam pressure | E | | F | |
|---|---|---|---|---|
| | T | E | T | E |
| 45 | | | | |
| 60 | | | | |
| 75 | | | | |
| 90 | 102 | 1,170 | 115 | 1,165 |
| 105 | 140 | 730 | 150 | 930 |
| 120 | 162 | 685 | 132 | 752 |
| 135 | 145 | 732 | 145 | 757 |
| 150 | 480 | 490 | 472 | 547 |

The term "rubber" herein is to be understood as including caoutchouc and similar vulcanizable gums, natural or synthetic, including latices thereof.

Other ratios of the compounding ingredients than those mentioned in the examples as well as other well known fillers, pigments and the like may be employed in the production of various types of rubber compounds as will be apparent to those skilled in the art to which this invention pertains.

Having thus described my invention, what I claim and desire to protect by Letters Patent is:

A reaction product of from two to three molecular proportions of an arylene-thiazyl sulfur chloride with one molecular proportion of ammonia and consisting essentially of a compound having the formula

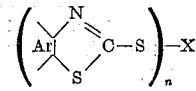

where Ar is an arylene group; $n$ is 2 and 3, respectively, when X is NH, and N, respectively.

WILLIAM E. MESSER.